Aug. 7, 1956
C. B. LETTERMAN
2,757,774
IMPRESSION REGULATING CONTROL FOR
POWER DRIVEN TYPEWRITERS
Filed June 23, 1953
2 Sheets-Sheet 1
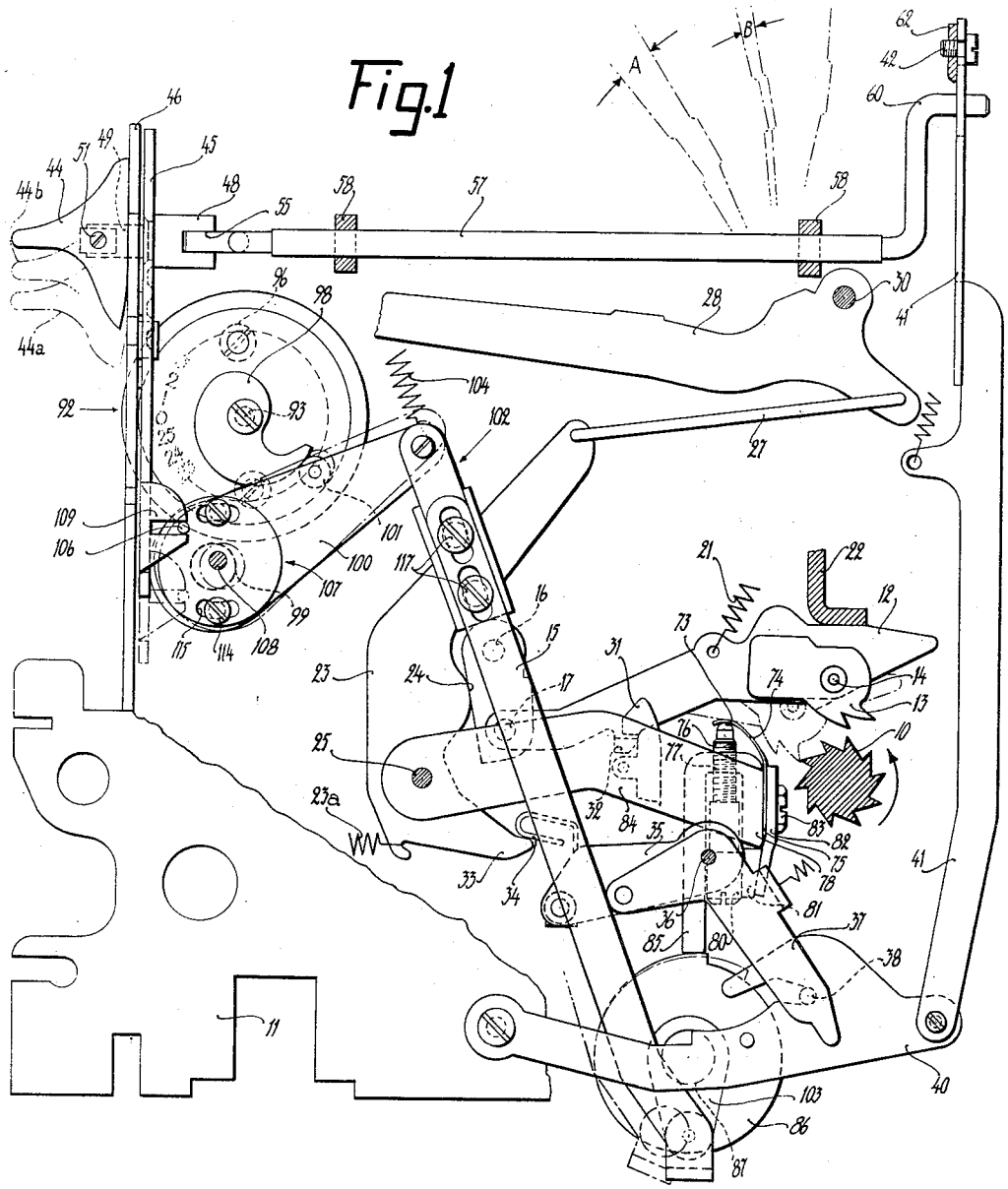
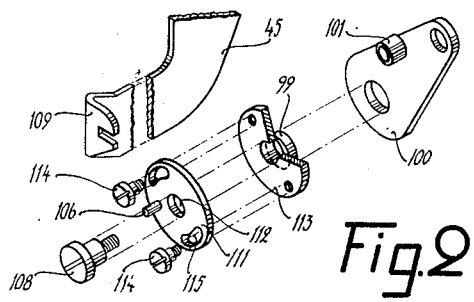
INVENTOR.
CHARLES B. LETTERMAN
BY Jesse A. Holton
ATTORNEY

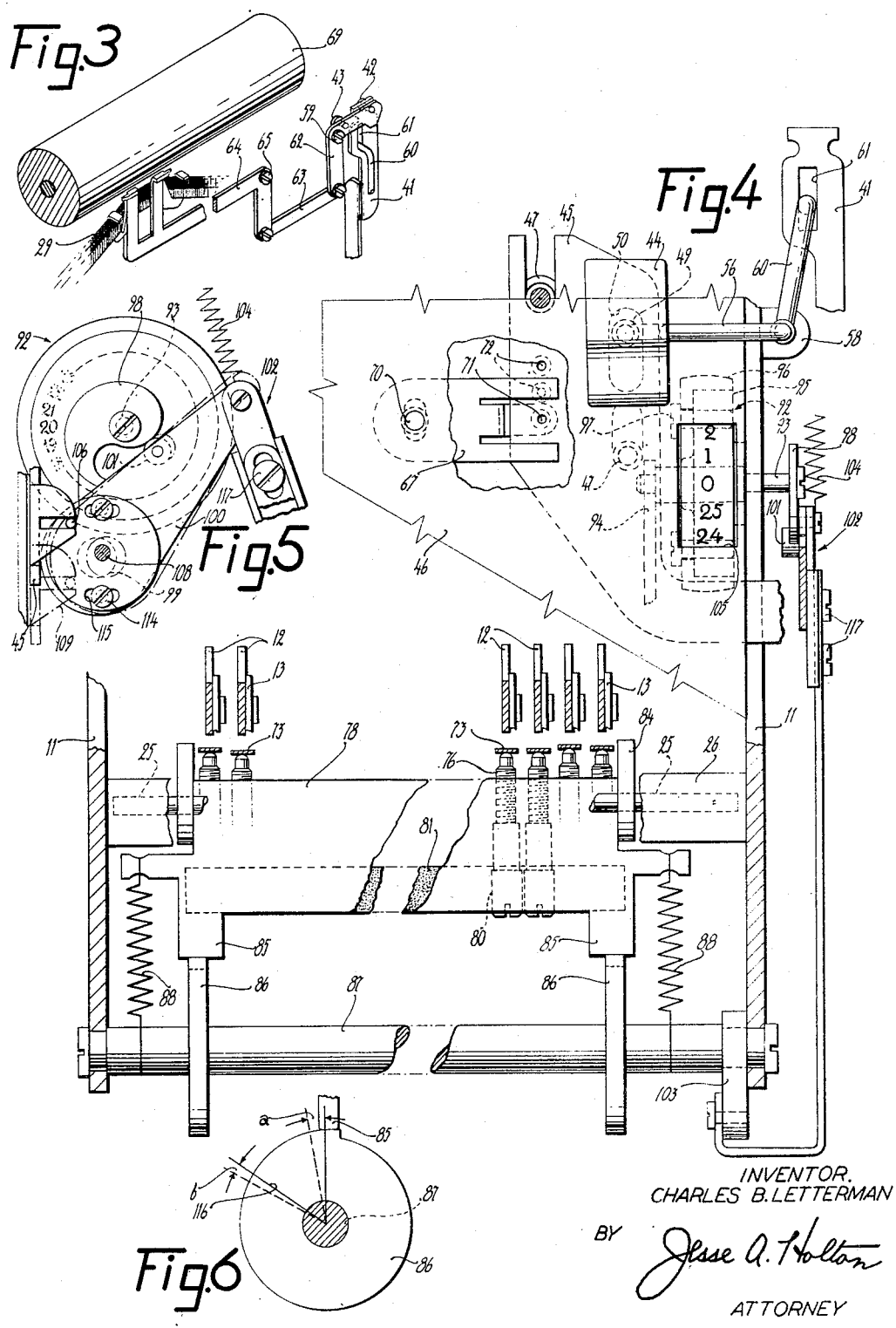

United States Patent Office 2,757,774
Patented Aug. 7, 1956

2,757,774

IMPRESSION REGULATING CONTROL FOR POWER DRIVEN TYPEWRITERS

Charles B. Letterman, West Hartford, Conn., assignor to Underwood Corporation, New York, N. Y., a corporation of Delaware Application June 23, 1953, Serial No. 363,441

7 Claims. (Cl. 197—17)

This invention relates to power driven typewriting machines in general and particularly also to power driven typing mechanisms wherein type action actuators are rendered active by movement thereof selectively into toothed motion-receiving relation with a continuously operating toothed power roll or shaft. In such machines, each actuator after receiving a predetermined extent of motion from the toothed power roll, engages an adjustable abutment which is instrumental to force or deflect the actuator clear of the toothed power roll.

The deflecting abutments for the various actuators are preferably individually adjustable and are usually borne on an impression regulating bar which for adjustment of the abutments collectively is adapted to be given different actuator stroke regulating positions. The U. S. patent to Sagner No. 2,369,315, dated February 13, 1945, discloses a machine embodying such an adjustable impression regulating bar and moreover includes on such bar individually adjustable abutments in the form of screws. In the known machines of this kind the actuators have not behaved accurately and reliably for given adjustments of the bar, and there was no apparent reason for such erratic behavior. A clue towards providing satisfactory actuator control came only with the realization that the disengagement of the actuators occurs against a strong gripping hold between the toothed driving roll and the actuator. Namely, it was discovered that due to great strain prevalent at the disengagement of the actuators the abutment bar has been subject to fluttering, causing the actuators to be forced out of toothed mesh with the driving roll inaccurately timed. It was also found that the time of throw-off of the actuator was influenced appreciably by the prevalent frictional conditions at the toothed actuator engagement at the instant the actuator contacted the deflecting abutment. In this figured the presence of more or less lubricant at the toothed engagement, and whether the machine had been standing idle, as well as other factors.

To obviate the stated varying or erratic behavior it was conceived that for accurate control of the actuators the abutment bar must be virtually non-yielding to the varying thrust or impact of the actuators, regardless of the position to which it may be adjusted.

Accordingly, it is an object of the invention to provide in association with a power typing mechanism of the stated kind, efficient, accurately and reliably effective means to control the actuators to execute operating strokes of accurately predeterminable magnitude.

A further object of the invention is to provide an efficient position regulating structure for an actuator disengaging element or bar to support it solidly against the varying severe impacts or thrusts attendant to any actuator engaging it, whereby to provide for accurately timed actuator disengagement.

In the typing strokes, each type bar after its power actuator becomes disengaged is slowed up in part by the energy which is needed to lift the usual typewriter ribbon vibrator. Depending on whether a ribbon vibrating mechanism is set to present a lower or upper ribbon field at a printing point, a respectively greater or lesser strength of actuator impulse is required if the typing impressions are to be of uniform vigor.

The patent hereinabove referred to includes mechanism for increasing the power strokes of the actuators whenever a ribbon vibrating mechanism is regulated for increased ribbon lift, and it is an object of the instant invention to provide a more efficient and improved mechanism of this kind.

In reference to the last noted object it is a more particular object also to provide a structure whereby the settings of the ribbon vibrating mechanism for relatively greater and lesser vibrations will produce adjustment effects for the actuator impulses which are varying in magnitude inversely to the strength-of-imprint settings given to an adjustable imprint control.

Other objects, all having relation to reliable and accurate control of the power typing mechanism, will be apparent upon consideration of the detailed description which follows, as such description is read in the light of the accompanying drawings.

In the accompanying drawings, Figure 1 is a fractional right-hand side elevation illustrating a power typing mechanism and structure whereby in accordance with the invention type action actuators are regulatable reliably and accurately to furnish accurately powered operating impulses, Figure 2 is an exploded perspective view illustrating certain parts of the power stroke regulating mechanism shown in Figure 1, Figure 3 illustrates in perspective aspect a portion of a ribbon vibrating mechanism used conventionally in typewriters, Figure 4 is a fractional front elevation generally of the mechanism and structure seen in Figure 1, Figure 5 is a side elevation of a portion of the actuator impulse regulating mechanism seen in Figure 1, but showing such mechanism in a different position, And finally, Figure 6 is a side elevation of a cam disc along with diagrammatic data pertaining thereto.

Referring now more particularly to Figure 1, the machine of the invention includes a power typing mechanism of the general structure disclosed in a patent to Yaeger, No. 2,254,764. This power typing mechanism comprises a toothed power member or drive roll 10 extending across the full width of the machine and rotatively supported in two opposite side walls 11 of the machine, in a manner not shown. While the machine is in use this roll 10 is power rotated continuously in the direction of the arrow seen in Figure 1. Normally posed idly above this toothed shaft are a series of type action actuators 12, arranged in the machine in parallel relation along side of each other in a straight transverse row. As viewed in Figure 1, each such actuator 12 carries a snatch pawl 13, pivotally as at 14, with capacity for a limited, short clockwise displacement. Arms 15 pendant from a transverse pivot rod 16 in the machine have at their lower ends, as at 17, the actuators 12 pivotally connected thereto and rearwardly extending therefrom. Each actuator 12 has a spring 21 biasing it upwardly and rearwardly, and all being normally in the position shown in Figure 1, in contact upwardly against an abutment bar 22, rearward limits for the actuators being provided by abutment means, not shown. Each of the pendant arms 15 has a rolling lever association with a sub-lever 23, as at 24, the various sub-levers 23 being fulcrummed on a common pivot wire 25 that extends transversely of the machine in a usual cross bar member 27, the latter provided with crosswise guide slots for the levers 23, not shown. At graded lengths from the pivot rod 25 the sub-levers 23, by means of wire links 27, are connected with type bars 28 that are carried upon a common pivot wire 30 to swing from divergent positions to a common printing point. Springs 23a bias individually the sub-levers 23 and related type bars 28 to their normal positions seen in Figure 1.

The said actuators 12 are selectively movable downwardly about the pivotal points 17 to bring the snatch pawls 13 thereon into transitory motion-receiving engagement with the toothed power roll or shaft 10. Such selective movement may be effected under control of type keys, not shown, having each a hook element 31 normally idly overlying a lateral protuberance 32 on one of the actuators 12. At operation of any type key its associated hook element 31 draws the related actuator 12 downwardly for the toothed power shaft 10 to pick up the snatch pawl 13. As has been stated, said snatch pawls 13 have capacity for a short, limited pivotal movement on their actuators. The teeth of the snatch pawl 13 thus are given the opportunity to come into full mesh with the teeth of the toothed roll 10 before the load of the actuator 12 and connected parts is encountered. Thereupon the power roll 10 drives the snatch pawl 13 and the actuator 12 unitarily, and there ensues a power operation of the associated type bar 28 toward the printing position. The actuator with its snatch pawl is automatically divorced from the toothed shaft 10 when the type bar has moved toward the printing point an appropriate extent to give a desired-strength printing impression. The means by which such divorcement is effected is more particularly the subject of the present invention, but it will be expeditious to describe first a mechanism whereby a normally idly positioned ink ribbon 29, see Figure 3, is vibrated at each typing stroke to position either an upper or a lower field of such ribbon at said printing point.

To the end of vibrating said ink ribbon 29, each of the sub-levers 23 includes a finger 33 underlying a universal bar member 34 extending transversely of the machine. Said member 34 includes near each side wall 11 of the machine an arm 35, which arms have pivotal support as at 36 upon the machine side walls 11. The right-hand arm 35 has fixedly associated therewith an arm 37 which has a pin 38 operative on a lever 40 to impart to the rear end of the latter at each operation of the universal bar 34 a downward movement. The downward movement of the lever 40 draws down a link 41 against the bias of a spring. The said link 41 may have operative association with either one of two pins 42, 43, depending on the setting of a ribbon vibration setting means or bichrome control 44. The bichrome control 44 is on slide 45 which is supported vertically slidably upon the rear of a front wall 46 of the machine, as by means of headed studs 47 on the rear of the wall 46 associated in slots of the slide. Support of said bichrome control 44 on said slide 45 is afforded by a stud 48 having a forwardly projecting portion 49 which extends through a clearance slot 50 in the front plate 46, a set screw 51 securing said bichrome control 44 to the stud portion 49. A rearwardly reaching portion of the stud 48 has a horizontal slot 55 whereinto there reaches a crank 56 integral with a shaft 57. The latter is pivotally supported in brackets 58 borne on the right-hand side wall 11 of the machine and has an upreaching crank 60 extending into a vertical slot 61 of the aforementioned link 41. The described structure provides that if the bichrome control 44 is in the full line position seen in Figures 1 and 4, the upper end of the link 41 will be coupled to the pin 42 and further provides that if the control 44 is in the dot-and-dash position 44a seen in Figure 1 then the link 41 is coupled with the pin 43. The said pins 42, 43 are provided on a bell crank 62 at different distances from a pivot 59 and said bell crank, by means of a link 63, is operative on a ribbon vibrator 64 pivoted at 65 and supporting the aforestated ink ribbon 29. If the link 41 is actuated in coupled condition with the pin 42 then the vibrator 64 at operation of any type action will position the upper, black field of the ribbon at the printing level of a platen 69. If the link 41 is actuated in coupled relation with the pin 43, then the vibrator 64 will move to a greater extent and will position the lower field of the ink ribbon 29 at said printing level.

In a position of the bichrome control 44 indicated at 44b in Figure 1, the link 41 is disassociated from both the pins 42, 43 so that actuation of said link 41 will leave the ribbon vibrator 64 undisturbed in normal position. This is for cutting stencils. The slide 45 supporting the bichrome control 44 has associated therewith a detent device 67 holding it resiliently detented in any one of the three stated positions of the bichrome control 44. Said detenting means 67 consists of a spring leaf member secured vertically adjustably at 70 to the rear of the front wall 46, and includes a spring finger having a protuberance 71 for entrance into three detent notches 72 of the slide 45.

As has been stated, the actuators 12 are automatically divorced from the toothed power shaft 10 and according to the invention improved adjustable means are provided for accomplishing this. Specifically, there is in the operating plane of each actuator 12, an individually adjustable abutment 73 afforded by a spring finger 74, the various spring fingers 74 being integral with a transverse plate 75 in the machine and each abutment 73 having solidly underlying it an adjustable screw 76 to vary individually its position. The various screws 76 are threadedly supported for adjustment as at 77 in an inverted, transverse channel bar 78. Smooth shank portions 80 of said screws fit closely between a front and a rear wall of the channel bar 78 and a friction pad 81 of rubber or the like is pressed from the rear against the lower portions of said shanks 80 by a plate 82 which is in overlying relation to spring finger plate 74 secured along with the latter to the channel bar by screws 83. The shanks 80 of the screws 76, under the pressure of the pad 81, are pinched and solidly confined between the said pad and the front wall of the channel bar, wherefore the adjustments of the screws, and therefore the adjustments of the abutments 73, are retained except when the screws are forcibly turned, as by a screwdriver.

The channel bar 78 at each of its opposite ends has integral therewith and bent therefrom a side arm 84, such arms having pivotal support on the same pivot wire 25 which supports the sub-levers 23 and moreover being confined laterally in the machine by accommodation in slots, not shown, provided in the cross bar 26. Directly underlying short, widely spaced, downwardly reaching tongues 85 on the front wall of the channel bar, substantially in a direction in which the actuators 12, in engaging the abutments exert violent shocks, there are two identical cam discs 86 fast on a heavy cross shaft 87 which is turnably supported in the opposite side walls 11 of the machine. Strong springs 88 attached to projecting lugs at opposite ends of the channel bar 78 and having anchorage on the cross shaft 87, keep the channel bar 78 at the tongues 85 always in solid contact upon the cam discs 86. In a manner yet to be explained, the said shaft 87 is turnably adjustable over a range of about ¼ turn and within such range said cam discs 86 will effect upward and downward adjustment of the abutment bar 78. It will be appreciated that the bar 78 is very stiff and that is always solidly supported by the cams 86 against the great shocks attendant when the actuators engage the abutments 73. There is no fluttering of the bar affecting the length of forced actuator movement, and differing frictional conditions which may be prevalent at the engaged actuators at the instant of disengagement have also no influence on the duration of actuator engagement.

A strength-of-imprint control in the form of a wheel generally designated by the number 92 is fast on a short shaft 93 and thereby is turnably carried on the right side wall 11 of the machine and a frame supported bracket 94. Referring more particularly to Figure 4, the imprint control or wheel 92 comprises a flange portion 95 carrying concentrically adjustable thereon, by means of screws, a ring 96 bearing indicia representative of imprint vigor.

There is provided, subject to supplementary control by said imprint control wheel 92 and said ribbon vibration setting control 44, a means to adjust said bar 78. For this purpose the right end of the shaft 93 carries fast thereon a spiral cam 98 for action on a lever 100 through the medium of an anti-friction roller 101 on the latter. Said lever 100 has a fulcrum 99 and one end of a composite link structure 102 is pivotally jointed to the free end of the lever 100 and has a pivotal connection at the other end with a crank arm 103 that is fast on the cam shaft 87. A fairly strong spring 104 urges the lever 100 upwardly for the roller 101 to bear constantly against the snail cam 98. In Figures 1 and 4 the impression control wheel 92 is set to obtain the lightest typing impressions, signified by a "0" thereon showing through an opening 105 in the front panel 46 of the machine. Correspondingly the abutment bar 78, through the cams 86 underlying it, is supported in the highest position. The average type bar actuator 12 will thus be forced clear of the toothed power roll 10 after a relatively short power stroke. If the wheel 92 is given a setting for the roll 101 to rest at or near the lowest position of the spiral cam 98, see Figure 5, then the average type bar will be power actuated a relatively long distance toward printing position, whereby the imprint then obtained will be relatively strong or vigorous.

Any type bar after divorcement of its related actuator 12 from the power roll 10 will complete its typing movement by momentum. Thus it will be seen that the load of the ribbon vibrator on the type action has a momentum impeding influence on the type bar moving toward printing position and that such influence is somewhat greater when the ribbon vibrating control 44 is set for causing the greater-extent vibrating action. It will also be observed that depending on the strength-of-imprint setting of the control 92, the stated impeding effect is respectively greater and smaller for respectively shorter and longer power stroke settings of the control 92. To compensate for these conditions the fulcrum 99 associated with the lever 100 is made shiftable by the ribbon vibration setting control 44, thereby to alter the position of the bar 78, the slide 45 whereon said control 44 is mounted having a fork 109 associated with a pin 106 on a disc device 107 that is pivoted on a headed stud 108 and carries in eccentric relation thereon the said fulcrum 99. The arrangement is further such that the magnitude of the adjustment effects by the vibration setting control 44 on the actuator disconnecting bar 78 will vary inversely to the strength-of-imprint setting of the imprint control 92, and appropriately so that on each setting of the imprint control the vigor of imprint will be identical for either setting of the control 44.

Referring to Figure 2, the stated disc device 107 comprises a disc 111 provided with a central hole 112 and having fast thereon the stated pin 106. Concentrically arranged with the disc 111 is another disc 113 carrying fast thereon the stated eccentric 99. Clamping screws 114 in slots 115 of the disc 111 which are concentrically arranged about the pivot hole 112, render the disc 113 concentrically adjustable on the disc 111, whereby the position of the eccentric 99 with reference to the disc 111 is alterable.

In Figure 1 wherein the ribbon vibrating control 44 is set to cause the smaller ribbon lift, the eccentric has the position indicated in dotted lines. When the ribbon control 44 is placed in the position 44a, the disc device 107 is rotated to place the eccentric 99 in a more slightly rearward position indicated in dot-and-dash lines. This causes a rearward displacement of the lever 100 to the indicated dot-and-dash position, the roller 101 in such displacement following the curvature of the cam 98 and the lever 100 rising appreciably at its juncture with the link 102. This, through repositioning of the cams 86, results in a downward adjustment of the impression regulating bar 78 to the end of predetermining longer power strokes of the actuators 12.

Comparing now Figures 1 and 5, it will be observed that stronger imprint settings of the control 92 will cause the lever 100 to lie at a sharper angle to the composite link 102. Due to this condition, as desired, the change of position of the eccentric 99 effectable by the ribbon control 44 will have progressively a lesser effect on the link 102 the more the impression control 92 is set for longer power strokes of the actuators. Consequently also the cams 86 underlying the bar 78 will be affected in a lesser degree by a shift of the control 44 the more the impression control is set for longer actuator strokes. In fact the structure is such that in any position of the impression regulating control 92 the machine will produce equal strength imprints regardless of whether the control 44 is set for a small or great ribbon lift. The aforestated adjustability of the eccentric 99 on the disc 111 serves to obtain the appropriate correlation of the parts to the stated end.

In further clarification of the above, reference is made to Figure 6 wherein the position of the cam 86 is the same as in Figure 1. Namely the cam 86 is in the position which prevails when the control 92 is set for the lightest impression and when the ribbon vibrating control 44 is set for the shorter ribbon lift. If the impression control 92 is left unchanged, but the ribbon control 44 is given the position 44a, then the cam 86 will be displaced clockwise the distance indicated at a, lowering the actuator disconnecting bar 78 slightly. If the position of the imprint control 92 is changed to that seen in Figure 5 and the ribbon control 44 given the short ribbon lift position of Figure 1, then the cam 86 in Figure 6 is turned clockwise to register the line 116 with the tongues 85 of the bar 78. Shifting of the ribbon control 44 then to the position 44a will reposition the cam 86 an angular distance b, which it will be observed is considerably smaller than the indicated angular distance a. This by way of example shows that the ribbon control 44 has progressively less regulating effect for progressively longer power stroke settings given to the strength-of-imprint control 92.

The angular distances of cam adjustment a and b, given hereinabove by way of example in reference to Figure 6 and which arise from manipulation of the control 44, predetermine differences of power movement of the type bars 28 as indicated by A and B in Figure 1.

To associate the arm 100 in appropriate operative correlation with the cams 86, the composite link 102 is comprised of two parts adjustably secured together at 117 for lengthening or shortening the composite link 102.

Having explained the nature and the objects of the invention, as well as a specific embodiment thereof, what is claimed is:

1. The combination with a series of type actions, a toothed power drive roll common to said type actions, and type action actuators arranged alongside of each other and selectively movable into toothed mesh with said power drive roll for type action operating strokes, of means comprising a bar located oppositely to the row of actuators and engageable by the individual actuators in their operating strokes to force them out of toothed mesh with the power drive roll, each actuator at engagement with said bar exerting a violent thrust thereon in a certain direction, and means to adjust said bar in said direction, comprising a shaft arranged parallel to said bar and lying in the direction of the stated thrust of the actuators, cams at spaced points fast on said shaft and contacted by said bar in the direction of said stated thrust to give support thereto, a strength-of-imprint control, a spiral cam turnable by said control, a follower element associated with said spiral cam, and means to transmit motion from said cam follower element to said shaft to give it different angular positions and thereby to cause said spaced cams to support solidly said bar in different positions.

2. The combination with a series of type actions, a toothed power drive roll common to said type actions, and type action actuators arranged alongside of each other and selectively movable into toothed mesh with said power drive roll for type action operating strokes, of means comprising a bar located oppositely to the row of actuators and engageable by the individual actuators in their operating strokes to force them out of toothed mesh with the power drive roll, each actuator at engagement with said bar exerting a violent thrust thereon in a certain direction, and means to adjust said bar in said direction, comprising a shaft arranged parallel to said bar and lying in the direction of the stated thrust, cams at spaced points fast on said shaft and contacted by said bar, a strength-of-imprint control at one end of the machine, a spiral cam turnable by said control, an arm displaceable by said spiral cam, and means including a link to transmit motion from said arm to said shaft to turn it.

3. In a typewriting machine the combination with a series of type actions having actuators which are selectively associable with a common power member for reception of type-action operating impulses, of ribbon vibrator means normally holding a typewriter ribbon removed from a printing point, type-action operated means to operate said vibrator means, vibrator setting means settable to one or another position to predetermine either a relatively small or a relatively great operation of said vibrator means for presentation of different ribbon fields at the printing point, an element adjustable to vary the type action operating impulses, settable strength-of-imprint control means, and means under supplementary control of said vibrator setting means and said imprint control means to adjust said element, said supplementary controlled means comprising means whereby in any position of the imprint control means, if said vibrator setting means is given settings respectively to predetermine said relatively great and said relatively small ribbon vibrations, such settings will produce adjustment effects on the adjustable element respectively to increase and to decrease the strength of the type action operating impulses, and comprising further means governed by the strength-of-imprint control means to predetermine the magnitude of said adjustment effects in a sense so that they vary in magnitude inversely to the strength-of-imprint settings given to the said imprint control means.

4. In a typewriting machine the combination with a series of type actions having actuators which are selectively associable with a common power member for reception of type-action operating impulses, of ribbon vibrator means normally holding a typewriter ribbon removed from a printing point, type-action operated means to operate said vibrator means, ribbon vibration setting means settable to one or another position to predetermine either a relatively small or a relatively great operation of said vibrator means for presentation of different ribbon fields at the printing point, adjustable means engageable by said actuators to effect divorcement thereof from said power member, settable strength-of-imprint control means, and means under supplementary control of said vibrator setting means and said imprint control means to adjust said adjustable means to effect variedly timed divorcements of said actuators, and comprising means whereby if in any position of the imprint control means said vibration setting means is given settings respectively to predetermine said relatively great and said relatively small ribbon vibrations, such settings will produce adjustment effects on the adjustable means to predetermine respectively later and earlier divorcement of the actuators, and comprising further means to predetermine the magnitude of said adjustment effects by the vibration setting means on said adjustable means in a sense so that they vary in magnitude inversely to the strength-of-imprint settings given the said imprint control means.

5. In a typewriting machine in combination with a toothed power drive roll and a series of type actions having actuators which are selectively movable into toothed engagement with said power drive roll for reception of type-action operating impulses, of ribbon vibrator means normally holding a type-writer ribbon removed from a printing point, type-action operated means to operate said vibrator means, ribbon vibration setting means settable to one or another position to predetermine either a relatively small or a relatively great operation of said vibrator means for presentation of different ribbon fields at the printing point, means comprising a transverse bar in the machine, engageable by said actuators to effect divorcement thereof from said power drive roll, said actuators at each said engagement exerting a violent thrust on said bar in a certain direction, cam means cooperative with said bar at spaced points to support and adjust it transversely of its length in the said direction of thrust and thereby to cause earlier or later timed divorcement of said actuators, settable strength-of-imprint control means, means under supplementary control of said vibration setting means and said imprint control means to adjust said cam means and comprising means whereby if in any position of the imprint control means said vibrator setting means is given settings respectively to predetermine said relatively great and said relatively small ribbon vibrations, such settings will produce adjustment effects on said cam means respectively to cause later and earlier divorcement of said actuators, and comprising further means governed by the imprint control means to predetermine said adjustment effects on said cam means in a sense so that they vary in magnitude inversely to the strength-of-imprint settings given the said imprint control means.

6. In a typewriting machine the combination with a series of type actions having actuators which are selectively associable with a common power member for reception of type-action operating impulses, of ribbon vibrator means normally holding a typewriter ribbon removed from a printing point, type action operating means to operate said vibrator means, ribbon vibration setting means settable to one or another position to predetermine either a relatively small or a relatively great operation of said vibrator means for presentation of different ribbon fields at the printing point, adjustable means engageable by said actuators to effect divorcement thereof from said power member after varyingly timed engagements, settable strength-of-imprint control means, an arm, a fulcrum for said arm, means connecting said arm controllingly with said adjustable means, a cam element operable by said settable strength-of-imprint control means to give said arm different positions about said fulcrum and thereby to change the position of said adjustable means, and means under control of said ribbon vibration setting means to change the position of said fulcrum so as to alter the position of said arm as prevalent under control of said cam element and thereby to effect a supplementary adjustment of said adjustable means.

7. In a typewriting machine the combination with a series of type actions having actuators which are selectively associable with a common power member for reception of type-action operating impulses, of ribbon vibrator means normally holding a typewriter ribbon removed from a printing point, type action operating means to operate said vibrator means, ribbon vibration setting means settable to one or another position to predetermine either a relatively small or a relatively great operation of said vibrator means for presentation of different ribbon fields at the printing point, means comprising a transverse bar in the machine engageable by said actuators to effect divorcement thereof from said power member, cam means cooperative with said bar at spaced points to support and adjust it to cause earlier or later timed divorcement of said actuators, settable strength-of-imprint control means, an arm, a fulcrum for said arm, means connecting said arm controllingly with said cam means, a cam element operable by said settable strength-of-imprint control means and associated with said arm to give it different positions about said fulcrum and thereby to change the position of said cam means, and means under control of said ribbon vibration setting means to change the position of said fulcrum and thereby to alter the position of said arm and effect a supplementary adjustment of said cam means.

References Cited in the file of this patent

UNITED STATES PATENTS

| | | |
|---|---|---|
| 1,695,492 | Hokanson | Dec. 18, 1928 |
| 2,095,068 | Koca | Oct. 5, 1937 |
| 2,474,741 | Kittel | June 28, 1949 |